United States Patent
Morales-Charlier

(10) Patent No.: US 11,979,402 B2
(45) Date of Patent: May 7, 2024

(54) METHOD, APPARATUS AND COMPUTER PROGRAM PRODUCT FOR EXCHANGING MESSAGES ACROSS A NETWORK

(71) Applicant: VOCALINK LIMITED, London (GB)

(72) Inventor: Magaly Morales-Charlier, London (GB)

(73) Assignee: VOCALINK INTERNATIONAL LIMITED, London (GB)

( * ) Notice: Subject to any disclaimer, the term of this patent is extended or adjusted under 35 U.S.C. 154(b) by 549 days.

(21) Appl. No.: 16/723,997

(22) Filed: Dec. 20, 2019

(65) Prior Publication Data

US 2020/0204553 A1    Jun. 25, 2020

(30) Foreign Application Priority Data

Dec. 20, 2018 (EP) .................................... 18214783

(51) Int. Cl.
| | |
|---|---|
| *H04L 29/06* | (2006.01) |
| *H04L 9/40* | (2022.01) |
| *H04L 12/911* | (2013.01) |
| *H04L 47/70* | (2022.01) |

(52) U.S. Cl.
CPC ............ *H04L 63/10* (2013.01); *H04L 47/827* (2013.01)

(58) Field of Classification Search
CPC ....... H04L 63/10; H04L 47/827; G06Q 40/00; G06Q 10/06
USPC .......................................................... 726/4
See application file for complete search history.

(56) References Cited

U.S. PATENT DOCUMENTS

| | | | |
|---|---|---|---|
| 9,922,364 B1* | 3/2018 | Chen ................... | G06Q 30/0635 |
| 11,568,377 B1* | 1/2023 | Goetz ................... | G07F 17/105 |
| 2001/0051889 A1* | 12/2001 | Haney .............. | G06Q 10/06375 |
| | | | 705/7.14 |

(Continued)

FOREIGN PATENT DOCUMENTS

WO        03/046681 A2     6/2003

OTHER PUBLICATIONS

Extended European Search Report issued in European Application No. 18214783.5, dated Jun. 21, 2019, 9 pages.

(Continued)

*Primary Examiner* — Tu T Nguyen
(74) *Attorney, Agent, or Firm* — Talem IP Law, LLP

(57) ABSTRACT

A method of exchanging messages across a network, the method comprising receiving a resource request message from an asset controller, the resource request message comprising asset data and a resource request, analyzing the resource request message in order to select at least one resource candidate from a plurality of available resource candidates, the resource candidates having a resource for exchange with the asset, sending the resource request message to the selected at least one resource candidate, receiving a resource approval message from the at least one resource candidate, the resource approval message being indicative of an approval to supply the resource in accordance with the resource request message, and in the event that the resource approval message indicates approval to supply the resource, generating a transaction authorization message, the transaction authorization message being used to authorize a transaction to supply the resource on the basis of the resource request message.

17 Claims, 5 Drawing Sheets

(56) References Cited

U.S. PATENT DOCUMENTS

| | | | |
|---|---|---|---|
| 2008/0071675 A1* | 3/2008 | Lebda | G06Q 40/02 705/38 |
| 2010/0174620 A1 | 7/2010 | Stringfellow et al. | |
| 2010/0250426 A1* | 9/2010 | Silva | G06Q 40/03 705/37 |
| 2019/0327509 A1* | 10/2019 | Lenhart | H04N 21/47211 |

OTHER PUBLICATIONS

International Search Report and Written Opinion Issued in International Application No. PCT/EP2019/084814, dated Jan. 31, 2020, 14 pages.
Communication Pursuant to Article 94(3) EPC issued in European Application No. 18214783.5, dated Nov. 22, 2022, 9 pages.

* cited by examiner

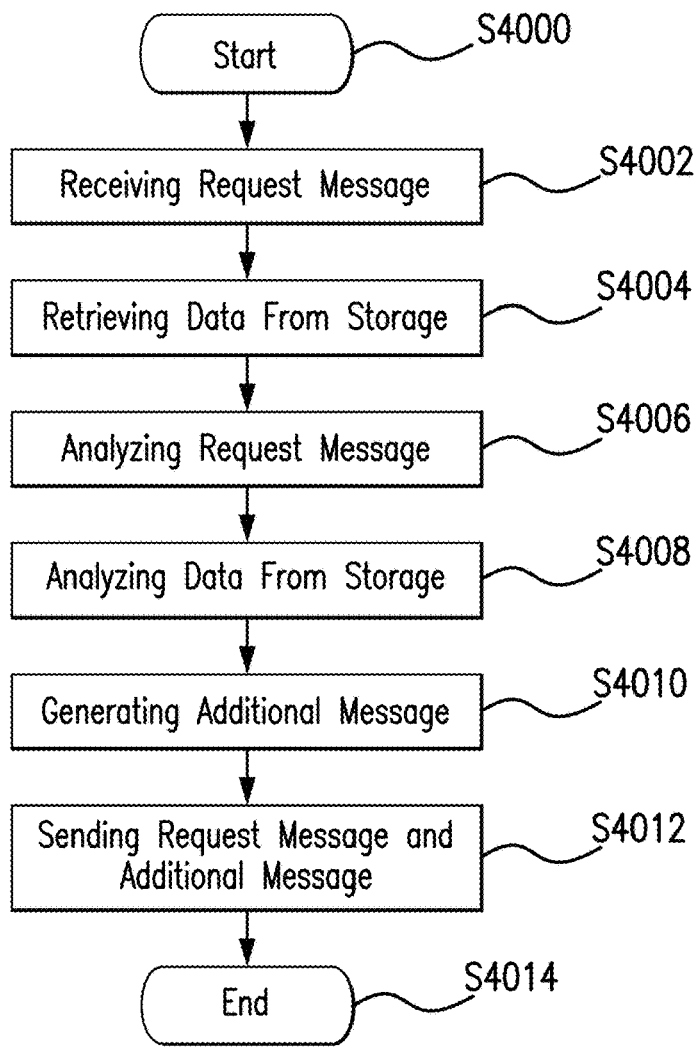

METHOD, APPARATUS AND COMPUTER PROGRAM PRODUCT FOR EXCHANGING MESSAGES ACROSS A NETWORK

TECHNICAL FIELD

The present invention relates to a method, apparatus and computer program product for exchanging messages across a network.

BACKGROUND

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

In certain situations an entity, such as a merchant or supplier of goods, may be in possession of a number of assets. Some of these assets, such as an invoice from a buyer which is to be completed at a future date, may have significant financial value to the merchant or supplier of goods. However, in the case of an invoice or the like, which is to be completed at a future date, the financial value of the asset can only be realized by the merchant upon the completion date. That is, while the asset will produce financial value at a certain point in the future (the completion date) the merchant or supplier of goods is unable to utilize said financial value of the asset prior to that date.

However, there are a number of mechanisms, such as supply chain financing, through which the merchant or supplier of goods can realize the value of an asset prior to a predetermined completion date. For example, if the merchant or supplier of goods desires that the financial value of the asset is realized prior to this date, they may approach a financial institution (such as a bank or the like) for early financing of the asset. That is, the financial institution may provide the merchant or supplier of goods with the financial value associated with the asset in exchange for control of the asset itself. Accordingly, the merchant or supplier of goods can receive at least a portion of the financial value of the asset prior to the predetermined completion date. In this case, the financial institution who has supplied the funds in exchange for the asset subsequently recovers the financial value of the asset from the buyer upon the completion date of the invoice.

Realizing the value of an asset in this manner can improve trading throughout the entire supply chain, since the funds associated with the asset can be utilized prior to the completion date itself. However, owing to the inherent risks and complexity associated with such financing techniques, it is often difficult for a merchant or supplier of goods to obtain early financing from a financial institution.

On the merchant's side, for example, it is often difficult and expensive to locate financial institutions that may be willing to provide resources in exchange for control of an asset. This issue may be exacerbated for small scale merchants, or for merchants in remote geographical locations.

Furthermore, on the financing side, it can be difficult to determine the level of risk associated with financing an asset. Again, this issue may be exacerbated when the financial institution does not have a direct financial relationship with the merchant requesting finance.

Furthermore, potential fraudsters are developing ever more sophisticated mechanisms for engaging in fraudulent activity. This level of sophistication, coupled with the vast number of financing requests which are received, makes it difficult for a financial institution to identify when a request is fraudulent in nature. Fraudulent transactions can lead to significant difficulties and costs for innocent parties in such transactions, and are sometimes very difficult to reverse once they have occurred.

In fact, even when a request is not fraudulent in nature, there is a certain level of risk to the financing entity who is supplying the resources in response to the request. For example, there may be a risk that the asset for which the resources have been exchanged cannot subsequently be used in order to recover the resources which have been supplied.

As such, these factors make financial institutions reluctant to engage in financing solutions, and thus make it difficult for a merchant to efficiently and securely obtain the desired levels of supply chain financing of assets in a network.

It is an aim of the present disclosure to address these issues.

BRIEF SUMMARY

In accordance with embodiments of the disclosure, a method of exchanging messages across a network is provided, the method comprising receiving a resource request message from an asset controller, the resource request message comprising asset data and a resource request, analyzing the resource request message in order to select at least one resource candidate from a plurality of available resource candidates, the resource candidates having a resource for exchange with the asset, sending the resource request message to the selected at least one resource candidate, receiving a resource approval message from the at least one resource candidate, the resource approval message being indicative of an approval to supply the resource in accordance with the resource request message and, in the event that the resource approval message indicates approval to supply the resource, generating a transaction authorization message, the transaction authorization message being used to authorize a transaction to supply the resource on the basis of the resource request message.

In accordance with embodiments of the disclosure, an apparatus for exchanging messages across a network, the apparatus comprising circuitry configured to receive a resource request message from an asset controller, the resource request message comprising asset data and a resource request, analyze the resource request message in order to select at least one resource candidate from a plurality of available resource candidates, the resource candidates having a resource for exchange with the asset, send the resource request message to the selected at least one resource candidate, receive a resource approval message from the at least one resource candidate, the resource approval message being indicative of an approval to supply the resource in accordance with the resource request message, and, in the event that the resource approval message indicates approval to supply the resource, generate a transaction authorization message, the transaction authorization message being used to authorize a transaction to supply the resource on the basis of the resource request message.

In accordance with embodiments of the disclosure, a computer program product is provide the computer program product comprising instructions which, when the program is executed by a computer, cause the computer to carry out a method of exchanging messages across a network, the method comprising receiving a resource request message from an asset controller, the resource request message comprising asset data and a resource request, analyzing the resource request message in order to select at least one resource candidate from a plurality of available resource candidates, the resource candidates having a resource for exchange with the asset, sending the resource request message to the selected at least one resource candidate, receiving a resource approval message from the at least one resource candidate, the resource approval message being indicative of an approval to supply the resource in accordance with the resource request message, and, in the event that the resource approval message indicates approval to supply the resource, generating a transaction authorization message, the transaction authorization message being used to authorize a transaction to supply the resource on the basis of the resource request message.

According to embodiments of the disclosure, messages required to authorize a transaction for supplying a resource on the basis of a resource request can be efficiently and securely exchanged across a network. This improves the security and efficiency associated with exchanging messages in a network. The present disclosure is not particularly limited to these effects, there may be others.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 illustrates a method according to embodiments of the disclosure;

FIG. 5 illustrates a table for data storage in accordance with embodiments of the disclosure.

DETAILED DESCRIPTION

Figure 1:
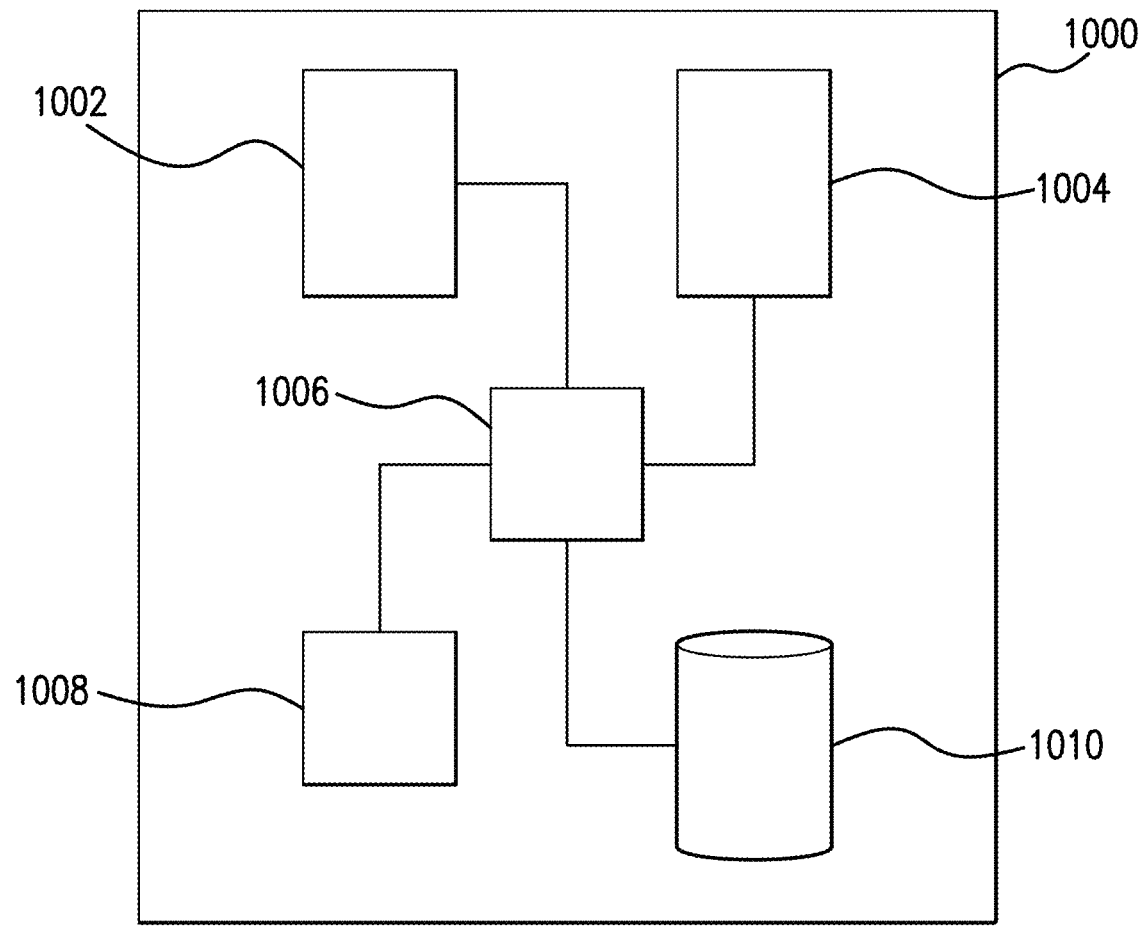
FIG. 1 illustrates an apparatus according to embodiments of the disclosure.

Referring now to the drawings, wherein like reference numerals designate identical or corresponding parts throughout the several views.

In FIG. 1, an apparatus 1000 according to embodiments of the disclosure is shown. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1006.

The processing circuitry 1006 may be a microprocessor carrying out computer instructions or may be an Application Specific Integrated Circuit. The computer instructions are stored on storage medium 1010 which may be a magnetically readable medium, optically readable medium or solid state type circuitry. The storage medium 1010 may be integrated into the apparatus 1000 or may be separate to the apparatus 1000 and connected thereto using either a wired or wireless connection. The computer instructions may be embodied as computer software that contains computer readable code which, when loaded onto the processor circuitry 1006, configures the processor circuitry 1006 to perform a method according to embodiments of the disclosure.

Additionally connected to the processor circuitry 1006, is a user input unit 1002. The user input unit 1002 may be a touch screen or may be a mouse or stylist type input device. The user input 1002 may also be a keyboard or any combination of these devices.

Communication circuitry 1004 is also coupled to the processing circuitry 1006. The communication circuitry 1004 may provide a connection to a Local Area Network or a Wide Area Network such as the Internet or a Virtual Private Network or the like. For example, the communication circuitry 1004 may be connected to infrastructure allowing the processor circuitry 1006 to communicate with other devices or infrastructure equipment in order to obtain or provide relevant data. For example, the communication circuitry 1004 may enable the apparatus 1000 to communicate with financial institutions in a banking network or the like. The communication circuitry 1004 may therefore be behind a firewall or some other form of network security.

Additionally coupled to the processing circuitry 1006, is a display device 1008. The display device, although shown integrated into the apparatus 1000, may additionally be separate to the apparatus 1000 and may be a monitor or some kind of device allowing the user to visualize the operation of the system. In addition, the display device 1008 may be a printer or some other device allowing relevant information generated by the apparatus 1000 to be viewed by the user or by a third party.

Exchanging Messages Across a Network:

As noted above, it is desirable to improve levels of efficiency and security when exchanging messages across a network in order to authorize a transaction for supplying resources on the basis of a resource request. Accordingly, a method of exchanging messages in a network is provided by embodiments of the disclosure. It will be appreciated that embodiments of the disclosure may be applied to financial situations such as supply chain financing or the like. However, the disclosure is not so limited and may be applied to messages used in any context.

Figure 2:
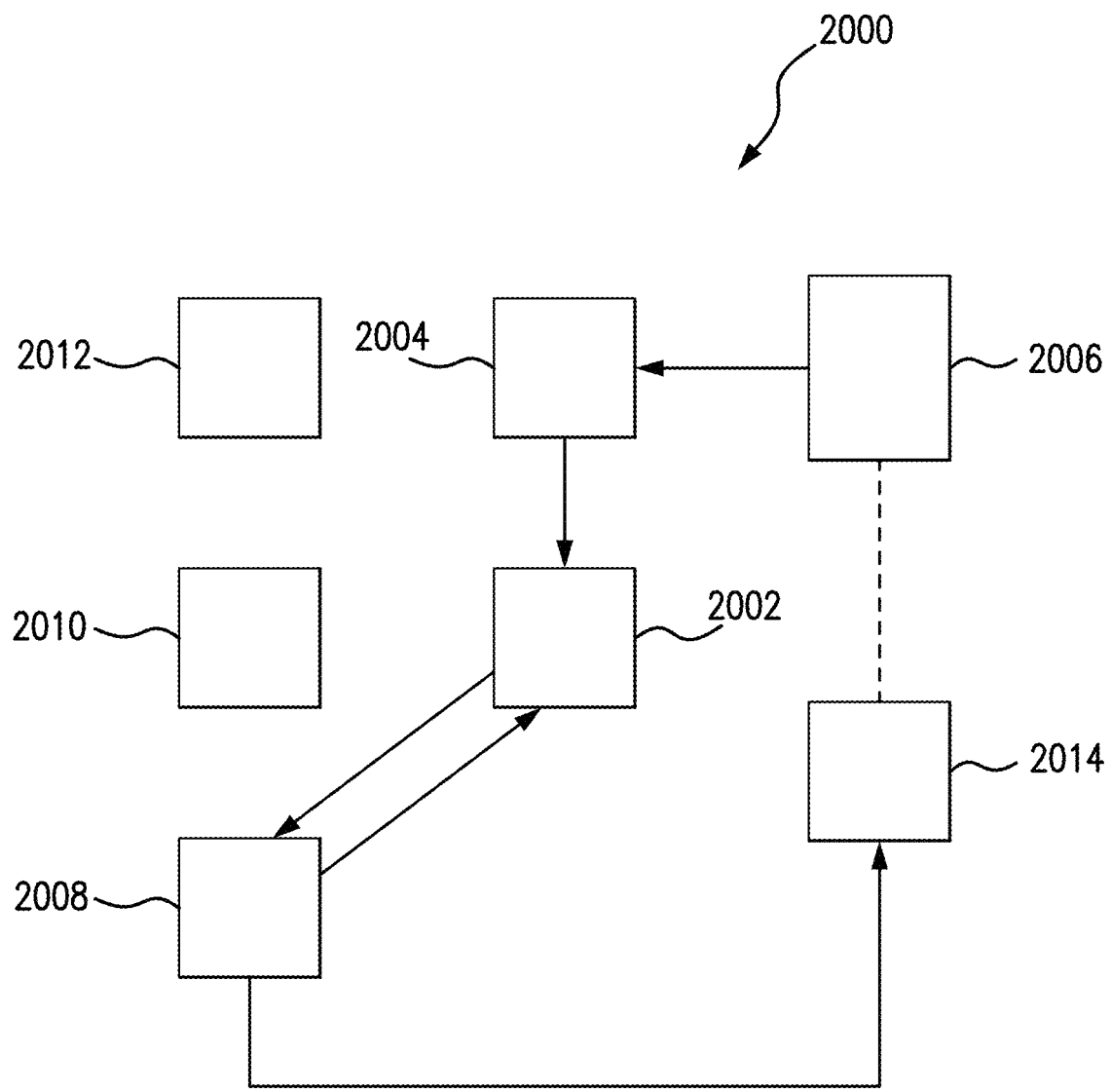
FIG. 2 illustrates a situation to which embodiments of the disclosure may be applied.

FIG. 2 illustrates a situation to which embodiments of the disclosure may be applied. In this example, a number of devices are provided at locations across a network 2000. Apparatus 2002 is an apparatus, such as apparatus 1000, for exchanging messages across a network in accordance with embodiments of the disclosure, and may be configured as described above with reference to FIG. 1.

In this example, an asset controller 2004 is provided. The asset controller 2004 is configured to store information regarding a number of assets which are owned by an asset owner (such as merchant 2006). That is, the merchant 2006 is the owner of a number of assets and information regarding those assets is stored in the asset controller 2004. It will be appreciated that the both the number and type of asset which is owned by the merchant 2006 are not particularly limited. However, in this specific example, the asset may relate to an invoice or the like. That is, the merchant 2006 may be a supplier of goods, and may have agreed to supply a certain number of those goods to a buyer for given purchase price at a predetermined time in the future. Accordingly, said invoice is of financial value to the merchant, although the financial value of the invoice is not due to be realized until the completion date of the invoice.

In this example, the asset controller 2004 is configured to store information regarding the assets owned by the merchant 2006. For example, the asset controller 2004 may store information regarding the number of assets owned by the merchant, the value of the assets owned by the merchant, the completion date of the respective assets, the type of goods or services to which each respective asset relates, or the like. Of course, it will be appreciated that the asset controller 2004 may be configured to securely store information regarding the assets owned by a number of separate and distinct merchants. Alternatively, the asset controller 2004 may be personal to each individual merchant. That is, a different asset controller 2004 may be provided for each merchant. However, in the case that the asset controller 2004 stores information regarding the assets owned by a number of separate and distinct merchants, it will be appreciated that each individual merchant may have secure access only to the assets personal to themselves.

In the example situation illustrated in FIG. 2, the merchant 2006 desires to submit a given asset for financing. That is, in order to realize the financial value of the asset prior to the predetermined completion date, the merchant 2006 seeks to exchange control of the asset with a financial institution in return for an appropriate level of funds. In other words, the merchant 2006 seeks to secure supply chain financing or the like for a given asset stored by the asset controller 2004.

It will be appreciated that the type of financing sought by the merchant is not particularly limited in this regard. For example, any type of supply chain financing, including that such as dynamic discounting, reverse factoring, or the like, may be sought in accordance with the specific situation to which the embodiments of the disclosure are applied. Regardless, in this specific example according to embodiments of the disclosure, the merchant may select an asset, such as an invoice or the like, stored on the asset controller 2004, as an asset for which early financing is desired.

Upon receiving said selection of an asset for early financing from merchant 2006, the asset controller 2004 may send a resource request message across the network to the apparatus 2002. As stated above, apparatus 2002 is an apparatus, such as apparatus 1000, for exchanging messages across a network, and may be configured as according as described above with reference to FIG. 1.

The resource request message received by the apparatus 2002 comprises asset data and a corresponding resource request. That is, in this specific example, the resource request message may comprise information regarding the asset which has been selected by the merchant 2006 for early financing, and may also comprise a corresponding resource request indicating the level and type of financing or resources which are requested. Of course, it will be appreciated that the asset data and the corresponding resource request are not particularly limited in this respect, and will vary in accordance with the specific situation. Further details regarding the resource request message, the asset data and the resource request itself are provided later.

As is illustrated in FIG. 2, a number of financial institutions 2008, 2010 and 2012 (such as banks or the like) are either present in, or connected to, the network. That is, it will be appreciated that each of the financial institutions 2008 to 2012 is connected to device 2002 over the network and are thus capable of transmitting and receiving messages to and from the apparatus 2002 over said network. Of course, it will be appreciated that the number of financial institutions connected to the apparatus 2002 is not particularly limited to the number illustrated in this specific example. Rather, the number may vary in accordance with the specific situation to which the embodiments of the disclosure are applied. Financial institutions 2008 to 2012 each form a resource candidate having a resource suitable for exchange with the asset which has been selected by merchant 2006 for financing. That is, in this example, each of the financial institutions 2008 to 2012 has financial resources which can be supplied to the merchant 2006 in exchange for control of the selected invoice.

The apparatus 2002 is configured to analyze the resource request message in order to determine at least one resource candidate from the plurality of available resource candidates. In other words, the apparatus 2002 is configured to perform analysis on the resource request message which has been received from the asset controller 2004, and will select at least one of the available financial institutions (or resource candidates) in accordance with the analysis.

Of course, it will be appreciated that the type of analysis performed by the apparatus 2002 in order to select the at least one financial institution, or resource candidate, is not particularly limited and will vary depending upon the specific situation. For example, in this specific example illustrated with reference to FIG. 2, the analysis and subsequent determination may depend upon the type of asset which has been selected by the merchant, the magnitude of the resources which have been requested in the resource request message, or the like. Further details regarding types of analysis which may be performed by apparatus 2002 in accordance with embodiments of the disclosure are described below.

Once the apparatus 2002 has performed the analysis on the resource request message, the apparatus 2002 sends the resource request message to the determined at least one resource candidate. That is, in this specific example illustrated with reference to FIG. 2, the apparatus 2002 determines financial institution 2008 as the best financial institution for financing of the resource from the analysis of the resource request message. Accordingly, apparatus 2002 sends the resource request message received from the asset controller 2004 to the financial institution 2008.

It will be appreciated that the embodiments of the disclosure are not particularly limited in this respect. That is, alternatively or in addition to the above, apparatus 2002 may decide, on the basis of the analysis of the resource request message, to send the resource request message to financial institution 2010 or 2012.

Moreover, as stated above, it will be appreciated that while the resource request message comprises asset data regarding the selected asset and a corresponding resource request, the precise form of the resource request message that is sent to financial institution 2008 is not particularly limited, and will vary in accordance with the situation to which the embodiments of the disclosure are being applied.

In this specific example, once the financial institution 2008 has received the resource request message from the apparatus 2002, the financial institution 2008 will determine whether or not it will provide the resources in accordance with the resource request. In other words, in this specific example, once the financial institution 2008 has received the resource request, it will determine whether to provide early financing of the invoice selected by the merchant 2006. It will be appreciated that the manner by which the financial institution determines whether or not to provide the financing of the invoice is not particularly limited in the present disclosure. However, regardless of the manner by which the determination is performed, once a determination has been made, the financial institution will generate a message indicative of an approval to supply the requested resource. This message is subsequently sent back to the apparatus 2002 across the network.

Accordingly, apparatus 2002 is configured to receive, from the financial institution 2008, the resource approval message (the resource approval message itself, in this specific example, being indicative of whether or not the financial institution 2008 will supply the financing of the invoice selected by the merchant 2006).

In certain situations, the financial institution may have declined to finance the invoice selected by the merchant. In these situations, the resource approval message will be indicative of the fact that the financial institution has declined to finance the selected invoice. Accordingly, when this is the case, upon receiving the resource approval message, the apparatus 2002 will realize that the financial institution 2008 will not finance the invoice which has been selected by the merchant 2006.

It will be appreciated that the response of the apparatus 2002 to the reception of the resource approval message indicative of a refusal to supply finance is not particularly limited, and will vary in accordance with the situation. For example, the apparatus 2002 may report the fact that financing has been declined to the asset controller 2004 (or directly to the merchant 2006). Alternatively or in addition, the apparatus 2002 may determine to take no further action in response to reception of the resource approval message. Alternatively or in addition, the apparatus 2002 may determine to send the resource request message received from the asset controller 2004 to at least one other financial institution to which the resource request message has not yet been sent. Alternatively or in addition, the apparatus 2002 may determine to wait until a resource approval message has been received from all the financial institutions to which the resource request message was sent before taking any further action in this respect.

Regardless, it will be appreciated that if the apparatus 2002 does not receive a message indicating that a financial institution is willing to finance the invoice which has been selected by the merchant 2006, eventually, the process will end without any financing of the invoice being obtained.

However, in the example illustrated with reference to FIG. 2, the financial institution 2008 determines that it will supply financing of the invoice which has been selected by the merchant 2006. Therefore, financial institution 2008 sends a resource approval message to the apparatus 2002, the resource approval message being indicative of the fact that the financial institution has elected to finance the invoice which has been selected by the merchant 2006 in accordance with the resource request message.

In an event such as this, whereby the resource approval message indicates approval to supply the resource, the apparatus 2002 is configured to generate a transaction authorization message on the basis of the resource approval message. Again, it will be appreciated that the form of the transaction authorization message itself is not particularly limited and may vary in accordance with embodiments of the disclosure. However, the transaction authorization message is, in itself, used in order to authorize a transaction to supply the resource to the merchant on the basis of the resource request message.

That is, in this specific example, upon receiving a positive indication from financial institution 2008, the apparatus 2002 will generate a transaction authorization message which is used to authorize a transaction transferring funds from the financial institution to the merchant 2006 in exchange for control the asset. In other words, and as illustrated in FIG. 2, once the transaction authorization message is generated, a transaction is performed between the financial institution 2008 and a bank account 2014 connected with the merchant 2006 in order to transfer the requested funds to the merchant's account 2014. In exchange, the financial institution 2008 receives control of the invoice which has been selected by the merchant 2006 for financing, and will therefore receive the associated funds from the buyer upon the completion date of the invoice. However, it will be appreciated that the present disclosure is not particularly limited in this regard. That is, in certain situations, the authorization message may be used to authorize a transaction to supply the resource on the basis of the resource request message without any requirement for the asset itself to be exchanged across the network. This may be the case, for example, where the financial institution already has access to the asset or asset data. In these situations, the transaction authorization message will be used in order to authorize a transaction to supply the requested resource on the basis of the resource request message.

In other words, in this specific example, the merchant 2006 has traded control of the selected invoice with the financial institution 2008 in return for advanced payment of the funds associated with that invoice. The financial institution 2008 will subsequently recuperate the funds from the buyer upon the completion date of the invoice.

As such, according to embodiments of the disclosure, the apparatus 2002 performs the functions required to efficiently exchange the messages across the network. That is, in this example, the merchant can submit an asset, such as an invoice, to the network for financing through use of a single resource request message sent to apparatus 2002. Since the apparatus 2002 is connected to a plurality of resource candidates, connection with the apparatus 2002 provides the merchant 2006 access to an open market of potential financers, thus increasing the potential for financing. Moreover, since messages are exchanged across the network through apparatus 2002, direct communication between the merchant and potential resource candidates is not required. This provides additional layers of security for both merchant and resource candidates and thus makes the network more secure.

Furthermore, as described above, the apparatus 2002 performs analysis on the received resource request messages, in order to determine at least one of the plurality of potential resource candidates as the resource candidate to which to send the resource request message. Since the resource request message is only sent to the selected resource candidates, the volume of messages exchanged across the network can be reduced. This makes the operation of the network more efficient. Furthermore, targeting resource candidates in accordance with the analysis performed on the request resource message ensures that the most appropriate resource candidates are selected for any given resource request, thus further improving the efficiency of the process and thus the network overall.

As such, according to embodiments of the disclosure, the messages required in order to authorize a transaction for supplying a resource on the basis of the resource request can be efficiently and securely exchanged across the network.

Figure 3A:
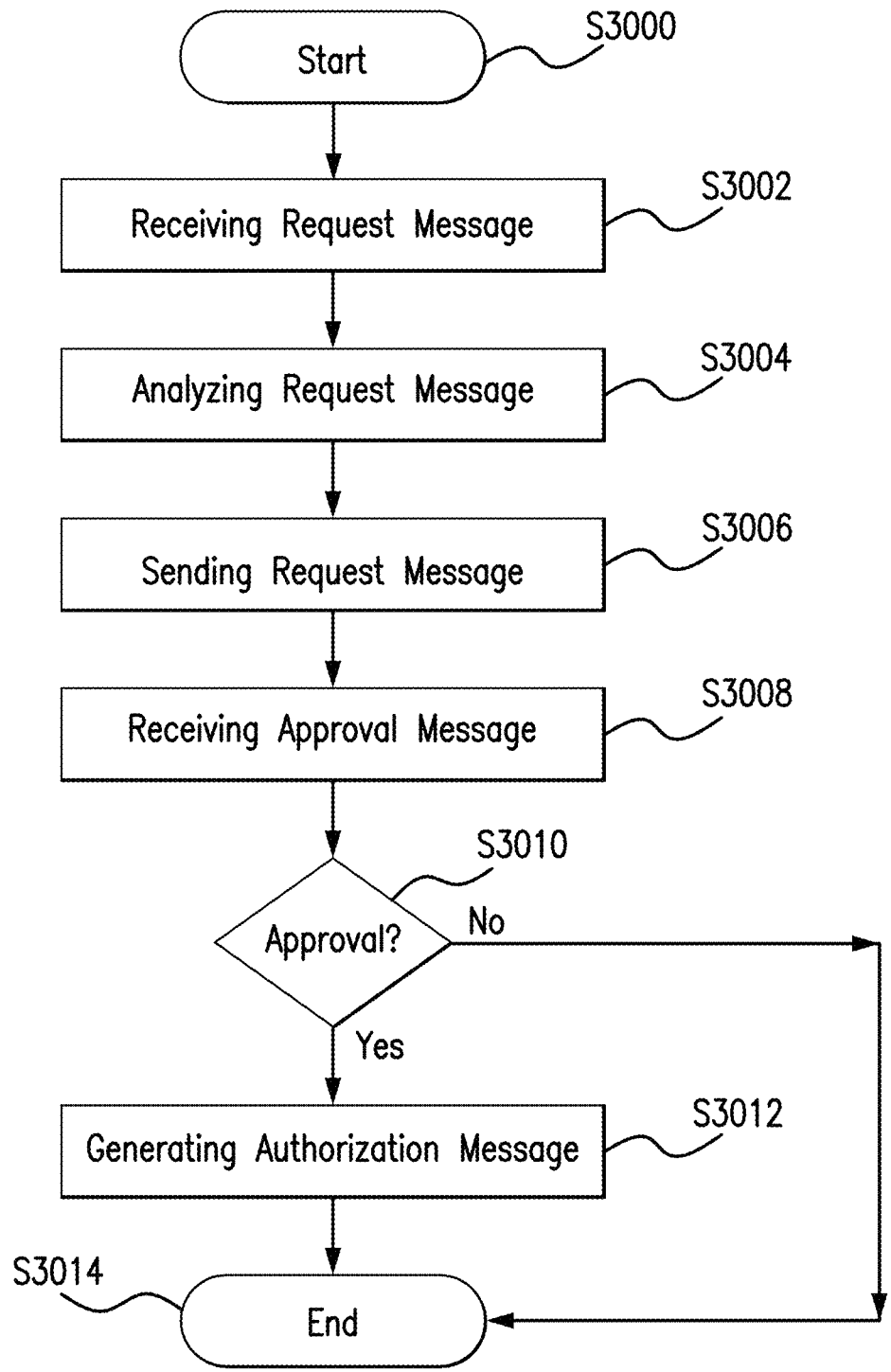
FIG. 3A illustrates a method according to embodiments of the disclosure.

Method of Exchanging Messages Across a Network:

FIG. 3A illustrates a method of exchanging messages across a network in accordance with embodiments of the disclosure. The method according to embodiments of the disclosure may be performed on the device 1000 as illustrated with reference to FIG. 1 above.

In accordance with embodiments of the disclosure, the method starts at step S3000 and proceeds to step S3002. Step S3002 comprises receiving a resource request message from an asset controller, the resource request message comprising asset data and a resource request. Step S3004 comprises analyzing the resource request message in order to select at least one resource candidate from a plurality of available resource candidates, the resource candidates having a resource for exchange with the asset. Step S3006 comprises sending the resource request message to the selected at least one resource candidate. Step S3008 comprises receiving a resource approval message from the at least one resource candidate, the resource approval message being indicative of an approval to supply the resource in accordance with the resource request message. Step S3010 comprises, in the event that the resource approval message indicates approval to supply the resource, generating a transaction authorization message, the transaction authorization message being used to authorize a transaction to supply the resource on the basis of the resource request message.

The method steps S3002 to S3010 are described in detail below, with reference to the exemplary situation illustrated in FIG. 2.

Receiving Request:

As described above, the method step S3002 comprises receiving a resource request message from an asset controller, the resource request message comprising asset data and a resource request. That is, according to embodiments of the disclosure, a resource request message will be received at step S3002, the resource request message comprising asset data and a resource request.

It will be appreciated that the manner by which the resource request message is received in accordance with embodiments of the disclosure is not particularly limited. That is, considering the example described with reference to FIG. 2, the resource request message may be received via a wired or wireless connection between apparatus 2002 and asset controller 2004. Moreover, the form of the resource request message itself is not particularly limited, provided that the resource request message comprises asset data and a resource request. Moreover, the format of the resource request message is not particularly limited, and any appropriate format may be used in accordance with the situation. However, in an example situation such as that illustrated with reference to FIG. 2, the message may be in an ISO XML format or other industry standard format as required.

The asset data contained in the resource request message is data indicative of the asset for which an exchange for resources is being sought. That is, the asset data enables the apparatus 2002 to determine the required information about the asset. Of course, the asset itself is not particularly limited and may vary in accordance with the situation to which the situation to which the embodiments of the disclosure have been applied. For example, in a financial situation such as that illustrated with reference to FIG. 2, the asset may include asset types such as invoices, purchase orders, inventory reports, contracts and the like. It will be appreciated, that in a financial situation such as that illustrated with reference to FIG. 2, the resource request message may be a Request-for-Finance (RFF) message or the like. Of course, the present disclosure is not particularly limited in this regard, and any such resource request message may be used in accordance with embodiments of the disclosure.

It will be appreciated that in certain situations, the asset data may comprise a direct or indirect copy of the asset itself. For example, when the asset is an invoice, a copy of the invoice may be included in the resource request message which is sent by the asset controller 2004 to the apparatus 2002. Alternatively, a copy of the asset may not be included in the asset data. Rather, in embodiments of the disclosure, the asset data may comprise metadata relating to the asset. For example, in the case of an invoice, the asset data may comprise metadata relating to the type of the invoice, the goods or services to which the invoice relates, the value of the invoice, the completion date of the invoice, information regarding the buyer and seller or the like.

Alternatively or in addition, the asset data in the resource request may comprise reference data which enables the apparatus 2002 to subsequently retrieve the necessary information regarding the asset as required. That is, and as described above with reference to FIG. 2, according to embodiments of the disclosure, the asset may not be included within the resource request message.

Furthermore, as stated above, in addition to the asset data, the resource request message comprises a resource request. That is, as well as describing the type of asset, the resource request message comprises information indicative of the type of resource which is being requested. Of course, the resource request itself is not particularly limited and may vary in accordance with the situation to which the embodiments of the disclosure have been applied.

For example, in a financial situation such as that illustrated with reference to FIG. 2, the resource request may define the type of finance or financial instrument which is being requested in the resource request message. Said financial instruments could include supply chain financing, reverse factoring, dynamic discounting or the like.

Figure 3B:
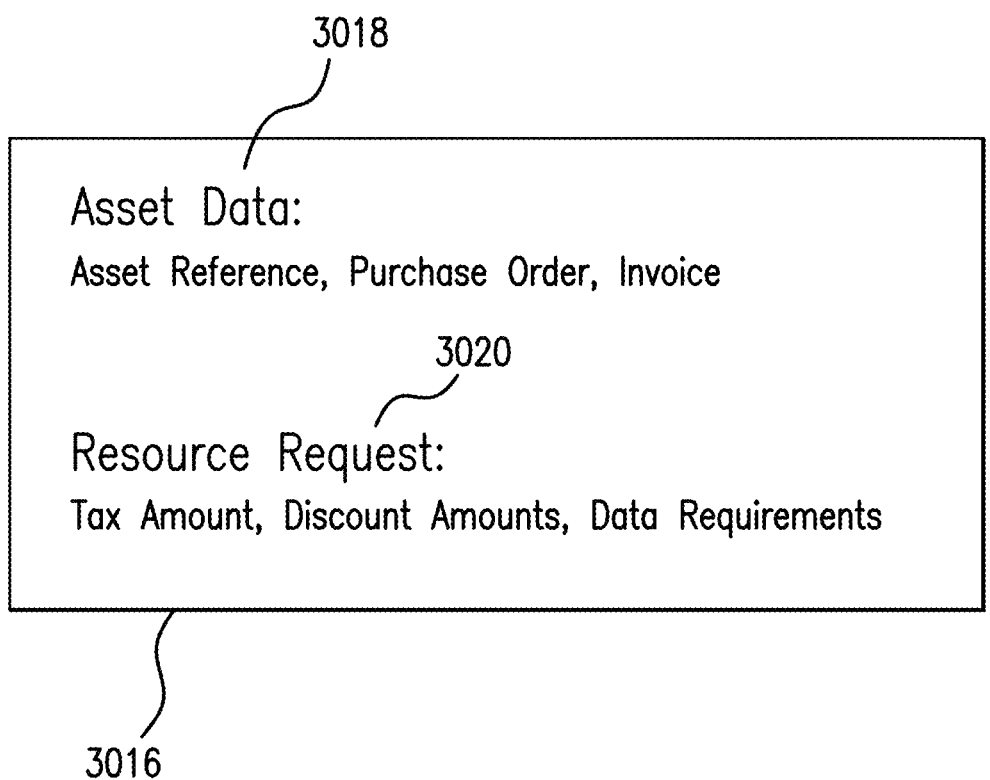
FIG. 3B illustrates an example resource request message in accordance with embodiments of the disclosure.

FIG. 3B illustrates an example resource request message in accordance with embodiments of the disclosure. The resource request message 3016 comprises asset data 3018 and a resource request 3020. As described above, the content of the asset data 3018 and the resource request 3020 is not particularly limited, and may vary in accordance with the situation to which the embodiments of the disclosure are being applied. However, in this example, the asset data 3018 comprises information regarding the asset such as a copy of the asset, a reference to the asset, a purchase order, an inventory report or a contract or the like. Moreover, the resource request comprises a request such as a requested discount amount, a discount reason, tax amounts related to the request and associated data requirements or the like. However, as stated above, it will be appreciated that there is no requirement for the asset itself to be included in the resource request message, or for the asset to be transferred across the network.

Of course, it will be appreciated that the resource request message illustrated with reference to FIG. 3B is an example of a resource request message which can be used in accordance with embodiments of the disclosure, and the present disclosure is not particularly limited in this regard.

Receiving the asset request message enables the apparatus to determine the necessary information regarding the asset data and the resource request. Once the message has been received, the method proceeds to step S3004.

Analyzing Request:

As described above, the method step S3004 comprises analyzing the resource request message in order to determine at least one resource candidate from a plurality of available resource candidates, the resource candidates having a resource for exchange with the asset.

As described with reference to the example illustrated in FIG. 2, a number of resource candidates may be available as candidates for supplying resources in exchange for control the asset. That is, the resource candidates, as described above, are candidates who have indicated that they may be willing to provide resources on the basis of the resource request (such as in exchange for an asset or in exchange for control of the asset, or the like). In certain situations, these may be candidates who have previously expressed an interest in supplying resources in response to such requests. Alternatively or in addition, the resource candidates may be determined from a known list of candidates or the like. Alternatively or in addition, the candidates may be detected based on those candidates who are in connection with apparatus 1000 at the time when the resource request message is received.

Furthermore, the resource candidates may, in certain situations such as those illustrated with reference to FIG. 2 of the disclosure, comprise financial institutions (such as a bank or the like). However, it will be appreciated that the present disclosure is not particularly limited in this regard. That is, the resource candidate may be a private financer or the like willing to provide finance in response to resource requests. In fact, according to embodiments of the disclosure, the resource candidate may be any such funding party who is willing to provide funds, resources or the like in response to such a request.

Regardless of the manner of determining the resource candidates, it will be appreciated that, in accordance with embodiments of the disclosure, a number of resource candidates are available, those candidates having a resource for exchange with the asset. Accordingly, the method according to embodiments of the disclosure comprises analyzing the resource request message in order to determine or select at least one resource candidate from the plurality of available resource candidates which are available.

The form of the analysis which is performed on the resource request message is not particularly limited, and will evidently vary in accordance with the form of the resource request message itself. However, according to embodiments of the disclosure, the method may comprise analyzing at least one of the type of the asset data, the type of the resource request, the magnitude of the resource request or the like.

Analyzing the resource request in this manner enables the determination of an appropriate selection of resource candidates from the plurality of resource candidates which are available.

Consider the situation illustrated with reference to FIG. 2, for example, whereby the resource request message comprises asset data indicative of the invoice selected by the merchant 2006 for financing, and the resource request message comprises a resource request indicative of the type of finance which is sought by the merchant 2006. Analyzing the resource request message in this case enables the determination of the resource candidate or resource candidates which are capable of fulfilling the resource request. For example, financial institution 2012 may have previously indicated that they do not engage in a certain type of financing which has been requested in the resource request message. As such, analysis of the resource request message as according to embodiments of the disclosure results in the determination not to send the resource request message to financial institution 2012 in this case.

Alternatively or in addition, for example, financial institution 2010 may have indicated that they do not engage in financing for invoices or requests beyond a certain magnitude or financial value. As such, analysis of the resource request message in this case may indicate that the resource request exceeds the value which financial institution 2010 is willing to provide. Accordingly, it can be determined not to send the resource request message to financial institution 2010 in this case.

Alternatively or in addition, the resource request information included in the resource request message received in step S3002 may comprise an indication of a desired financial institution or type of financial institution (such as financial institution 2008). In this case, following analysis of the resource request message, the method may comprise determining financial institution 2008 as the selected financial institution.

Of course, it will be appreciated that while in the example described with reference to FIG. 2 a single resource candidate is selected, the present disclosure is not intended to be particularly limited in this regard. That is, following the analysis of the resource request, any or all of the appropriate resource candidates will be selected in accordance with embodiments of the disclosure. This may be, for example, a plurality of resource candidates. The number selected may vary in accordance with the number of candidates which are available, and the type of request which has been made.

Once the resource request message has been analyzed, the method proceeds to step S3006.

Sending Request:

As described above, method step S3006 comprises sending the resource request message to the selected at least one resource candidate.

In embodiments of the disclosure, the resource request message sent to the selected at least one resource candidate is the same as the resource request message which was received in step S3002. However, it will be appreciated that, according to embodiments of the disclosure, the method may comprise providing additional information when sending the resource request message to the selected at least one resource candidate in step S3006. Alternatively or in addition, the method may comprise modifying the format of the resource request message which was received in step S3002 such that it is in an appropriate format for sending to the selected at least one resource candidate.

It will be appreciated that the manner by which the resource request message is sent in accordance with embodiments of the disclosure is not particularly limited. That is, considering the example described with reference to FIG. 2, the resource request message may be sent to the selected at least one financial institution (2008, 2010, 2012) via a wired or wireless connection between apparatus 2002 and the selected financial institutions (2008, 2010, 2012).

The form of the resource request message itself is not particularly limited, provided that the resource request message comprises asset data and a resource request. Moreover, the format of the resource request message is not particularly limited, and any appropriate format may be used in accordance with the situation. However, in an example such as that illustrated with reference to FIG. 2, the message may be in an ISO XML format or other industry standard format as required.

Once the resource request message has been sent to the selected at least one resource candidate, the method proceeds to step S3008.

Receiving Approval Message:

As described above, step S3008 comprises receiving a resource approval message from the at least one resource candidate, the resource approval message being indicative of an approval to supply the resource in accordance with the resource request message.

As described above with reference to method steps S3002 and S3006, the mechanism by which the resource approval message is received in accordance with embodiments of the disclosure is not particularly limited. That is, considering the example described with reference to FIG. 2, the resource approval message may be received from the selected at least one financial institution (2008, 2010, 2012) via a wired or wireless connection between apparatus 2002 and the selected financial institutions (2008, 2010, 2012).

Moreover, the form of the resource approval message itself is not particularly limited, provided that the resource approval message comprises data being indicative of an approval to supply the resource in accordance with the resource request message. Moreover, the format of the resource approval message is not particularly limited, and any appropriate format may be used in accordance with the situation. However, in an example such as that illustrated with reference to FIG. 2, the message may be in an ISO XML format or other industry standard format as required.

Regardless of the form of the resource approval message, according to embodiments of the disclosure, the resource approval message is used in order to indicate whether or not the selected at least one resource candidate will supply the resource in accordance with the resource request message.

Consider again the example illustrated in FIG. 2 of the present disclosure. Once the resource request message has been sent to financial institution 2008 in step S3006, the financial institution 2008 will determine whether to supply the requested resources in accordance with the resource request message. The manner by which the financial institution 2008 determines whether to supply the requested resources is not particularly limited. However, once the decision has been made, the financial institution sends the resource approval message to the apparatus 2002.

It will be appreciated that the type of approval which is given may vary in accordance with the request itself. For example, in certain situations, the approval may indicate immediate approval of the supply of resources. This may be the case, for example, where the financial institution is satisfied that the resource request is a genuine or low risk resource request. For example, immediate approval may be granted to resource requests originating from a specific merchant, resource requests below a threshold value or the like. Alternatively or in addition, immediate approval may be granted to resource requests of a given type, such as whether the resource request is for dynamic discounting, reverse factoring or the like.

Alternatively, in certain situations, the resource approval message may indicate that deferred approval of the supply of resources is granted. That is, the approval message may indicate that approval will be granted at a predetermined time, or once a predetermined condition has been met. For example, deferred approval may be granted to resource requests above a threshold value. In such a case, owing to the inherently higher risk factor, the financial institution may indicate approval of the supply of finance, but only once additional verification has been performed on the resource request. Deferred approval may also be granted if the asset is a non-approved form of asset.

Alternatively, in certain situations, the resource approval message may indicate that approval of the supply of resources is not granted. That is, the resource approval message comprising data indicative of the approval of the supply of resources may indicate that resources will not be supplied by the financial institution. Non-approval of the supply of resources may be generated by the financial institution in a circumstance such as where the resource request exceeds a given value or where the financial institution is not prepared to supply the resources to the merchant in accordance with the resource request message which has been received.

Once the resource approval message has been received, the method proceeds to step S3010.

As described above, in step S3010, once the approval message has been received, the method comprises determining whether or not approval has been granted by the resource candidate. That is in the event that the resource approval message indicates approval to supply the resource, the method proceeds to step S3012. That is, if a positive approval is granted by the resource candidate, a positive approval being either an immediate or deferred approval, then the method according to embodiments of the disclosure proceeds to step S3012.

In contrast, if the resource approval message indicates that approval to supply the resources has not been granted, then the method proceeds to step S3014. That is, as described with reference to the example illustrated in FIG. 2 above, upon reception of a negative approval the method may proceed immediately to step S3014. Alternatively, the method may proceed to step S3014 only once a negative approval has been received from all the resource candidates to which the resource request message was sent in step S3006.

Furthermore, according to embodiments of the disclosure, if a negative approval is received from all the resource candidates to whom the resource request message was sent, the method may comprise sending an indication to the merchant that their request to exchange control of the asset in return for resources has been declined in the present case. At this stage, if desired, the merchant may decide to submit a new resource request (using a different asset or based on a different type of resource request). At this stage, the method would return to method step S3002 of the present disclosure.

As described above however, in the event that the resource approval message indicates approval to supply the resource, the method proceeds to method step S3012.

Generating Authorization Message

Method step S3012 is reached in the event that the resource approval message indicates approval to supply the resource. In this step, the method according to embodiments of the disclosure comprises generating a transaction authorization message, the transaction authorization message being used to authorize a transaction to supply the resource on the basis of the resource request message.

It will be appreciated that the type of transaction authorization message which is generated according to embodiments of the disclosure will vary in accordance, at least in part, with the type of approval which has been granted by the resource candidate in step S3012, or the form of the resource request which was made. For example, in certain situations, the transaction authorization message may be used in order to provide a set fraction of the requested resources to the merchant, or may be used to initiate a series of transactions that will provide the requested resources to the merchant over a given timescale.

In the event that the resource approval message indicates approval to supply the resource, generating a transaction authorization message, the transaction authorization message being used to authorize a transaction to supply the resource on the basis of the resource request message. That is, according to embodiments of the disclosure, the transaction authorization message may be used in order to authorize a transaction to supply resources in accordance with the terms, details or the like provided in the resource request message. For example, the transaction may be authorized on the basis of the type of resource request which has been made, associated data requirements of the request or the like.

In the event where immediate approval to supply the resource has been received, the method may comprise generating the transaction approval message in substantially real time following the reception of the resource approval message. Accordingly, in these situations, the method according to embodiments of the disclosure enables a merchant to secure a supply of resources on the basis of the resource request in a substantially real time environment.

Alternatively, where deferred approval to supply the resource has been received, the method according to embodiments of the disclosure may comprise generating the transaction authorization message only once a predetermined condition has been met. That is, according to embodiments of the disclosure, the generation of the transaction approval message in step S3012 may be delayed until such time that the conditions attached to the deferred approval have been satisfied.

Of course, as described above, the conditions for the deferred approval will vary depending on the specific requirement of the resource candidate. However, said conditions may comprise delaying the generation of the transaction authorization message until a predetermined period of time following the receipt of the approval message has expired. Alternatively or in addition, said condition may comprise waiting until a further approval message has been received from the resource candidate. Accordingly, in these situations, it is possible for a resource candidate to delay the supply resources in accordance with the resource request until such stage that more extensive security checks and the like have been completed.

It will further be appreciated that the format of the transaction authorization message which is generated in method step S3012 is not particularly limited, and will vary in accordance the situation to which the embodiments of the disclosure are applied. However, in an example such as that illustrated with reference to FIG. 2, the message may be in an ISO XML format or other industry standard format as required.

Nevertheless, the transaction authorization message which is generated in accordance with embodiments of the disclosure is used to authorize a transaction to supply the resource on the basis of the resource request.

Consider again the example illustrated in FIG. 2 of the present disclosure. Once a positive resource approval message is received by apparatus 2002 from financial institution 2008, the method according to embodiments of the disclosure comprises generating a corresponding transaction authorization message which is used to authorize the transfer of funds from the financial institution 2008 to the merchant 2006, or an account associated with said merchant 2006, in accordance with the resource request message. Accordingly, the transaction authorization message will comprise all the necessary information to authorize the transaction in the given situation.

That is, in this specific example, the transaction authorization message will comprise the asset data, the request data, data indicative of the merchant 2006, data indicative of the financial institution 2008, and associated data requirements such as the tax amount or the like. However, it will be appreciated that the transaction authorization message is not particularly limited in this regard, and will vary in accordance with the situation.

Moreover, according to embodiments of the disclosure, the method may further comprise sending the transaction authorization message which has been generated to one or more respective entities in the network. For example, according to embodiments of the disclosure, the method may comprise sending the transaction authorization message to at least one of the merchant 2006, the asset controller 2004 and the resource candidate who is supplying the resources (such as financial institution 2008) as required.

Furthermore, according to embodiments of the disclosure, the transaction authorization message may be used in order to authorize a transaction to supply the resources in exchange for the asset. That is, the transaction may be used in order to supply the resource in exchange for control of the asset indicated in the asset data of the resource request. Alternatively, the transaction may be used in order to supply the resources in exchange for the asset itself. However, it will be appreciated that even in the case whereby the supply of resources is made in exchange for control of the asset, the asset itself may not be transmitted across the network. Consider the example illustrated with reference to FIG. 2 of the disclosure. In certain situations, financial institution 2008 may already have access or access rights to the asset (such as an invoice held by the asset control 2004). In this case, there is no requirement to exchange the asset over the network. Rather, the resources may be supplied on the basis of the resource request in exchange for control of the asset. That is, control or ownership of the asset may be exchanged from the merchant to the financial institution in accordance with the resource request without transmission of the asset itself across the network.

It will be appreciated that the present disclosure is not particularly limited, provided the transaction authorization message may be used to authorize a transaction to supply he resource on the basis of the resource request.

In the method illustrated with reference to FIG. 3A, once the transaction authorization message has been generated, the method proceeds to, and ends with, method step S3014.

Advantageous Effects:

Hence more generally, a method of exchanging messages across a network has been provided in accordance with the method illustrated in FIG. 3A of the present disclosure.

Through the method of exchanging messages across a network according to embodiments of the disclosure, the messages required to authorize a transaction for suppling a resource on the basis of a request for resource can be efficiently and securely transferred across the network.

That is, exchange of control of an asset for resources may be sought through the submission of a single resource request message to a single apparatus 1000. In fact, according to embodiments of the disclosure, direct communication between the merchant and potential resource candidates is not required. This provides additional layer of security for both merchant and resource candidates.

Moreover, as described above, since detailed analysis is performed on resource request messages which are received, a resource request message is only sent the resource candidates who are likely to provide the requested resources. Accordingly, the volume of messages exchanged across the network can be reduced. Furthermore, targeting resource candidates in accordance with the analysis performed on the request resource message ensures that the most appropriate resource candidates are selected for any given resource request.

The effects produced by the method according to embodiments of the present disclosure are not limited to these effects, there may be others.

Identification Data:

FIG. 4 illustrates a method of exchanging messages across a network according to embodiments of the disclosure. The method according to embodiments of the disclosure may be performed on the device 1000 as described with reference to FIG. 1 above.

FIG. 4 illustrates method steps S4000 to S4010. However, it will be appreciated that once the method step S4010 has been performed, the method according to embodiments of the disclosure proceeds to step S3008 as described with reference to FIG. 3A above. In other words, once method step S4010 has been completed, the present method is substantially the same as that described with reference to FIG. 3A above. Accordingly, for brevity of disclosure, method steps S3008 to S3014 are not illustrated in FIG. 4, and a repetition of the description for these steps will not be provided at this stage.

In step S4002, the method comprises receiving a resource request message from an asset controller, such as asset controller 2004 illustrated in FIG. 2. As described with reference to FIG. 3A, the resource request message comprises asset data and a resource request. However, according to embodiments of the disclosure, in addition to this information, the resource request message received in step S4002 comprises identification data indicative of the owner of the asset data. That is, the request message comprises information specifically indicating the owner of the asset data, such as merchant 2006, who is requesting a supply of resources.

It will be appreciated that the manner by which the identification information is included in the resource request is not particularly limited. For example, in certain situations, such as a financial situation whereby the asset is an invoice or the like, an identification of the merchant may already be included within the asset data itself. However, in other situations, an identification of the owner of the asset data may be provided as additional information within the resource request message. Moreover, it will be appreciated that the identification information could be a name, an identification number, a reference to an identification profile or the like. That is, the identification information is merely information by which the owner of the asset can be identified.

Once the resource request message has been received, the method proceeds to step S4006.

Retrieving Data from Storage:

In step S4006, the method comprises retrieving data associated with the identification data from a storage unit. That is, when the resource request message comprises identification data indicative of the owner of the asset data, the method according to embodiments of the disclosure comprises using the identification data to retrieve additional data from a storage unit.

It will be appreciated that the storage may be internal to the apparatus 1000, such as memory 1010 described with reference to FIG. 1. Alternatively, the storage unit may be external to the apparatus 1000, with the apparatus 1000 being in communication with the storage unit. That is, the storage unit may be located separate from the device 1000 in a network, with the device 1000 being in wired or wireless connection with the storage unit.

It will be appreciated that the additional data retrieved from the storage unit in step S4006 is not particularly limited, and will vary in accordance with the situation to which the embodiments of the disclosure are being applied. For example, the identification data received in the resource request message can be linked to a profile or database containing additional contextual information regarding the asset owner, such as merchant 2006, who has made the resource request. Said information may comprise information regarding previous resource requests the merchant 2006 has made, information regarding the type of asset usually associated with the merchant 2006, information regarding the goods or services typically provided by the merchant 2006, time since the merchant 2006 has previously made a resource request, the completion status of previous resource requests or the like.

FIG. 5 illustrates a table for data storage in accordance with embodiments of the disclosure. In other words, FIG. 5 provides an example of the manner by which said data may be stored in the storage unit accessible by a device such as device 1000. A column, 5002, is provided, the column comprising identification information for a given asset owner. Subsequent columns 5004 to 5010 are provided, said columns providing information which is associated with the corresponding asset owner. As such, in this example, the first column is used to locate the records with a given asset owner, and the cells in the subsequent columns 5004 to 5010, on the same row as the row corresponding to the identified asset controller, are used to store the records corresponding to that asset owner. Accordingly, once the asset owner has been identified, information associated with the identification data can be retrieved from the storage unit.

However, it will be appreciated that the storage table 5000 illustrated in FIG. 5 is one such example of how additional information regarding the asset owner may be stored and retrieved from the storage unit. That is, for example, the number of records associated with each asset owner, the type of information stored and the manner of storage and retrieval may vary in accordance with the situation, and the present disclosure is not particularly limited in this respect.

Regardless, once the data associated with the identification data has been retrieved from the storage unit, the method proceeds to step S4006. In step S4006, the method comprises performing analysis on the asset data and the resource request received in the resource request message. It will be appreciated, however, that method step S4006 is substantially the same as method step S3004 described with reference to FIG. 3A above. Accordingly, for brevity of disclosure, a repetition this step is not provided at this stage. Once step S4006 has been completed, the method proceeds to step S4008.

Analyzing Data from Storage:

In step S4008, the method comprises performing additional analysis on the information which has been retrieved from the storage. That is, once the additional data has been retrieved from the storage unit in accordance with the identification data, the method according to embodiments of the disclosure comprises performing additional analysis on said additional data retrieved from the storage unit.

Of course, it will be appreciated that the type of analysis performed in step S4008 is not particularly limited, and will vary in accordance with the information which has been retrieved from the storage unit.

In certain situations, analysis performed on the data from the storage in accordance with embodiments of the disclosure, may be used in order to determine the authenticity of the resource request message which has been received in step S4002. Moreover, said authenticity can be used in order to identify a resource request message which is potentially fraudulent in nature.

Consider the example whereby the data associated with the identification data comprises data indicative of previous resource request messages associated with the owner of the asset data. In this case, the method according to embodiments of the disclosure may comprise analyzing the data indicative of previous resource request messages in order to determine the authenticity of the resource request. That is, a comparison between the present resource request message and previous resource request messages associated with the owner of the asset data can be used in order to determine the authenticity of the present resource request message which has been received in step S4002.

In the example described with reference to FIG. 2, merchant 2006 (the asset owner) has selected an invoice stored in the asset controller 2004 as an asset for which early financing is desired. Accordingly, the asset controller 2004 has sent a resource request to the device 2002 (which can be a device such as device 1000 described with reference to FIG. 1). The resource request, as received by device 2002, comprises asset data, a resource request and identification data. In this example, device 2002 subsequently uses the identification data in order to retrieve data indicative of previous resource request message associated with the owner of the asset data (the merchant 2006) from a storage unit.

In this example, subsequent analysis of the data indicative of previous resource request message associated with the owner of the asset data thus demonstrates that there is a strong correlation between the present resource request being made by the merchant 2006 and the previous resource requests made by that merchant 2006. That is, for example, it may be determined that the present invoice relates to similar goods and services, is of a similar magnitude or value, has been made after a similar time interval or from a similar location or the like to those previous resource requests made by the merchant 2006.

Accordingly, in such a situation, when the correlation between the resource request message received in step S4002 and the data indicative of previous resource request messages associated with the owner of the asset data is high, it can be determined that the resource request message has a high authenticity factor. In contrast, when the correlation between the resource request message received in step S4002 and the data indicative of previous resource request messages associated with the owner of the asset data is low, it can be determined, from the analysis performed in step S4008, that the authenticity of the request is low.

According to embodiments of the disclosure, when the authenticity of the resource request message is determined to be below a threshold value, it may be determined that the resource request message is a resource request message which is potentially fraudulent in nature. The threshold value can be determined based upon any suitable method, such as theoretical or empirical modelling or the like.

Of course, the method of analysis used in order to determine the authenticity of the resource request message received in step S4008 and thus whether or not the resource request is fraudulent in nature is not particularly limited in this respect, and may vary depending on the context of the situation.

Determining fraudulent requests, in accordance with embodiments of the disclosure, further improves the security with which messages required authorize a transaction for supplying a resource on the basis of a resource request can be exchanged across the network.

Alternatively, or in addition, the analysis performed on the data from the storage unit in accordance with embodiments of the disclosure may be used in order to identify a level of reliability, or risk factor, associated with the resource request.

Consider an example where the data retrieved from the storage unit, in step S4008, as data which is associated with the identification data received with the resource request message in S4002, is data indicative of the status of previous transactions or previous resource requests. In this case, the method according to embodiments of the disclosure may comprise performing an analysis of the status of previous transactions, or resource requests associated with the asset owner, in order to identify a level of reliability, or a risk factor, associated with the present resource request.

Where the asset data in a resource request corresponds to an invoice, for example, the data indicative of the status of previous transactions may indicate the number or percentage of previous invoices related to the asset owner that were successfully completed on the completion date of the invoice. From this value, a reliability score can be determined, indicating the likelihood that the invoice of the present resource request will be completed by the completion date. Of course, the manner by which the risk factor or the reliability score is determined as according to embodiments of the disclosure is not particularly limited, and may vary in accordance with both the resource request and the type of data retrieved from the storage unit.

Alternatively or in addition, the analysis performed on the data from the storage unit in accordance with embodiments of the disclosure may be used, at least in part, in the selection of the at least one resource candidate.

Consider again the example described above with reference to FIG. 2. In this situation, merchant 2006 may have a long standing record in securing finance from financial institution 2008, for example. Accordingly, in this situation, the data retrieved from the storage unit may be indicative of this relationship. Alternatively, for example, the data may be indicative of the fact that a number of resource requests from merchant 2006 to financial institution 2008 have been rejected. In either event, the method according to embodiments of the disclosure may comprise using this information as part of the determination as to where to send the present resource request which has been received.

Using the data retrieved from the storage unit in order to determine the reliability of the resource request, or to select at least one resource candidate from the plurality of available resource candidates, as described above, further improves the efficiency with which messages required to authorize a transaction for supplying resources on the basis of a resource request can be exchanged across the network.

Once the analysis has been performed in step S4008, the method proceeds to step S4010.

Generating Additional Message:

In step S4010, the method, according to embodiments of the disclosure, comprises generating, on the basis of the analysis which has been performed in step S4008, an additional message to send to the selected at least one resource candidate with the resource request message.

It will be appreciated that the content of the additional message will vary in accordance with the analysis which has been performed. For example, where the analysis of the additional data is used in order to determine the authenticity of the resource request, and thus determine whether or not the resource request is fraudulent in nature, the method according to embodiments of the disclosure may comprise generating a reporting message indicative of this analysis. That is, when it has been determined that the resource request is potentially fraudulent in nature, the method may comprise generating a reporting message indicating that the resource request is a potentially fraudulent request.

Alternatively or in addition, when the analysis performed in step S4008 is used to determine the reliability of the message, the method according to embodiments of the disclosure may comprise generating a reliability message indicative of the reliability of an asset indicated in the asset data of the resource request message.

It will further be appreciated that the format of the additional message which is generated in method step S3012 is not particularly limited, and will vary in accordance the situation to which the embodiments of the disclosure are applied. However, in an example such as that illustrated with reference to FIG. 2, the message may be in an ISO XML format or other industry standard format as required.

Moreover, in certain situations, the additional message generated in step S4010 may be separate and distinct from the resource request message received from the asset controller. However, in other situations, generating the additional message may comprise adding the additional information produced by the analysis in step S4008 to the resource request message which was received from the asset controller in order to generate a single resultant resource request message.

Regardless of the method of generating the additional message, once the message has been generated in accordance with embodiments of the disclosure, the method proceeds to step S4012. In step S4012, the resource request message, and the additional message or message content, are sent to the at least one selected resource candidate.

Receiving the resource request message, alongside the additional message or message content, improves the ability of the at least one selected resource candidate to determine whether or not to supply the resource in accordance with the resource request, without the need for any direct communication between the merchant and the selected at least one resource candidate. As such, the method according to embodiments of the disclosure it is possible to efficiently and securely exchange messages across a network in order to authorize a transaction for supplying a resource on the basis of a resource request.

Additional Modifications:

While aspects of the present disclosure have been describe with reference to the specific example illustrated with reference to FIG. 2, it will be appreciated that the present disclosure is not particularly limited in this regard. That is, embodiments of the disclosure may be applied to any situation requiring efficient and secure exchange of messages across a network as desired.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Clauses:

It should be noted that the present technology may also take the following configurations.

Clause 1. A method of exchanging messages across a network, the method comprising: receiving a resource request message from an asset controller, the resource request message comprising asset data and a resource request; analyzing the resource request message in order to select at least one resource candidate from a plurality of available resource candidates, the resource candidates having a resource for exchange with the asset; sending the resource request message to the selected at least one resource candidate; receiving a resource approval message from the at least one resource candidate, the resource approval message being indicative of an approval to supply the resource in accordance with the resource request message; and in the event that the resource approval message indicates approval to supply the resource, generating a transaction authorization message, the transaction authorization message being used to authorize a transaction to supply the resource on the basis of the resource request message.

Clause 2. The method according to Clause 1, wherein the resource request message comprises identification data indicative of the owner of the asset data, and the method comprises retrieving data associated with the identification data from a storage unit.

Clause 3. The method according to Clause 2, wherein when the data associated with the identification data comprises data indicative of previous resource request messages associated with the owner of the asset data, the method comprises analyzing the data indicative of previous resource request messages in order to determine the authenticity of the resource request.

Clause 4. The method according to Clause 3, wherein analyzing the data indicative of previous resource request messages in order to determine the authenticity of the resource request comprises analyzing at least one of the temporal distribution of resource requests, the magnitude of resource requests and the type of the asset data associated with the resource requests.

Clause 5. The method according to Clauses 3 or 4, comprising identifying the resource request as a fraudulent resource request when the determined authenticity of the resource request is below a threshold value and generating a reporting message indicating that the resource request is fraudulent.

Clause 6. The method according to Clause 2, wherein when the data associated identification data comprises data indicative of the status of previous transactions, the method comprises generating a reliability message indicative of the reliability of the asset indicated in the asset data of the resource request.

Clause 7. The method according to Clauses 5 or 6, wherein the method comprises sending at least one of the reporting message and the reliability message to the selected at least one resource candidate with the resource request message.

Clause 8. The method as according to Clause 1, wherein analyzing the resource message in order to select at least one resource candidate from a plurality of available resource candidates comprises analyzing at least one of the type of asset data or the magnitude of the resource request.

Clause 9. The method as according to Clause 2, comprising analyzing the data associated with the identification data retrieved from the storage unit in the selection of the at least one resource candidate.

Clause 10. The method according to Clause 1, wherein the transaction authorized by the transaction authorization message is a transaction to supply the resource in exchange for control of the asset.

Clause 11. The method according to Clause 1, wherein at least one of the resource request message, the approval message and the transaction authorization message is in an ISO XML data format.

Clause 12. The method according to Clause 1, wherein when the approval message indicates a deferred approval to supply the resource, the method comprises generating the transaction authorization message once a predetermined condition has been met.

Clause 13. The method according to Clause 12, wherein the predetermined condition is at least one of the expiry of a predetermined period of time following receipt of the approval message and the receipt of a further approval message from the selected resource candidate.

Clause 14. An apparatus for exchanging messages across a network, the apparatus comprising circuitry configured to: receive a resource request message from an asset controller, the resource request message comprising asset data and a resource request; analyze the resource request message in order to select at least one resource candidate from a plurality of available resource candidates, the resource candidates having a resource for exchange with the asset; send the resource request message to the selected at least one resource candidate; receive a resource approval message from the at least one resource candidate, the resource approval message being indicative of an approval to supply the resource in accordance with the resource request message; and in the event that the resource approval message indicates approval to supply the resource, generate a transaction authorization message, the transaction authorization message being used to authorize a transaction to supply the resource on the basis of the resource request message.

Clause 15. A computer program product comprising instructions which, when the program is executed by a computer, cause the computer to carry out a method of exchanging messages across a network, the method comprising: receiving a resource request message from an asset controller, the resource request message comprising asset data and a resource request; analyzing the resource request message in order to select at least one resource candidate from a plurality of available resource candidates, the resource candidates having a resource for exchange with the asset; sending the resource request message to the selected at least one resource candidate; receiving a resource approval message from the at least one resource candidate, the resource approval message being indicative of an approval to supply the resource in accordance with the resource request message; and in the event that the resource approval message indicates approval to supply the resource, generating a transaction authorization message, the transaction authorization message being used to authorize a transaction to supply the resource on the basis of the resource request message.

What is claimed is:

1. A method of exchanging messages across a network, the method comprising:
   receiving a resource request message from an asset controller, the resource request message comprising asset data of an asset and a resource request indicating a level and type of financing, wherein the asset controller stores information regarding assets owned by a number of separate and distinct asset owners, including the asset data of the asset;
   analyzing the resource request message in order to select at least one resource candidate from a plurality of available resource candidates, the resource candidates having a resource corresponding to the level and type of financing for exchange for control of the asset;
   modifying a format of the resource request message to an appropriate format for sending to the selected at least one resource candidate;
   sending the modified resource request message to the selected at least one resource candidate;
   receiving a resource approval message from the at least one resource candidate, the resource approval message being indicative of an approval to supply the level and type of financing in accordance with the resource request of the modified resource request message; and
   in an event that the resource approval message indicates approval to supply the level and type of financing, generating a transaction authorization message, the transaction authorization message being used to authorize a transaction to supply the level and type of financing on the basis of the modified resource request message.

2. The method according to claim 1, wherein the resource request message comprises identification data indicative of an owner of the asset data, and the method comprises retrieving data associated with the identification data from a storage unit.

3. The method according to claim 2, wherein when the data associated with the identification data comprises data indicative of previous resource request messages associated with the owner of the asset data, the method comprises analyzing the data indicative of previous resource request messages in order to determine an authenticity of the resource request.

4. The method according to claim 3, wherein analyzing the data indicative of previous resource request messages in order to determine the authenticity of the resource request comprises analyzing at least one of a temporal distribution of resource requests, a magnitude of resource requests and a type of the asset data associated with the resource requests.

5. The method according to claim 3, comprising identifying the resource request as a fraudulent resource request when the determined authenticity of the resource request is below a threshold value and generating a reporting message indicating that the resource request is fraudulent.

6. The method according to claim 5, wherein the method comprises sending at least one of the reporting message and a reliability message to the selected at least one resource candidate with the modified resource request message.

7. The method according to claim 2, wherein when the data associated identification data comprises data indicative of a status of previous transactions, the method comprises generating a reliability message indicative of the reliability of the asset indicated in the asset data of the resource request.

8. The method according to claim 7, wherein the method comprises sending at least one of a reporting message and the reliability message to the selected at least one resource candidate with the modified resource request message.

9. The method according to claim 2, comprising analyzing the data associated with the identification data retrieved from the storage unit in the selection of the at least one resource candidate.

10. The method according to claim 1, wherein analyzing the resource message in order to select at least one resource candidate from a plurality of available resource candidates comprises analyzing at least one of a type of asset data or a magnitude of the resource request.

11. The method according to claim 1, wherein the transaction authorized by the transaction authorization message is a transaction to supply the resource in exchange for control of the asset.

12. The method according to claim 1, wherein at least one of the resource request message, the approval message, and the transaction authorization message is in an ISO XML, data format.

13. The method according to claim 1, wherein when the approval message indicates a deferred approval to supply the resource, the method comprises generating the transaction authorization message once a predetermined condition has been met.

14. The method according to claim 13, wherein the predetermined condition is at least one of an expiry of a predetermined period of time following receipt of the approval message and the receipt of a further approval message from the selected resource candidate.

15. The method of claim 1, wherein the modified resource request message includes the asset data of the asset and the resource request indicating the level and type of financing.

16. An apparatus for exchanging messages across a network, the apparatus comprising circuitry configured to:
receive a resource request message from an asset controller, the resource request message comprising asset data of an asset and a resource request indicating a level and type of financing, wherein the asset controller stores information regarding assets owned by a number of separate and distinct asset owners, including the asset data of the asset;
analyze the resource request message in order to select at least one resource candidate from a plurality of available resource candidates, the resource candidates having a resource corresponding to the level and type of financing for exchange for control of the asset;
modify a format of the resource request message to an appropriate format for sending to the selected at least one resource candidate;
send the modified resource request message to the selected at least one resource candidate;
receive a resource approval message from the at least one resource candidate, the resource approval message being indicative of an approval to supply the level and type of financing in accordance with the resource request of the modified resource request message; and
in an event that the resource approval message indicates approval to supply the level and type of financing, generate a transaction authorization message, the transaction authorization message being used to authorize a transaction to supply the level and type of financing on the basis of the modified resource request message.

17. A non-transitory computer program product comprising instructions which, when the program is executed by a computer, cause the computer to carry out a method of exchanging messages across a network, the method comprising:
receiving a resource request message from an asset controller, the resource request message comprising asset data of an asset and a resource request indicating a level and type of financing, wherein the asset controller stores information regarding assets owned by a number of separate and distinct asset owners, including the asset data of the asset;
analyzing the resource request message in order to select at least one resource candidate from a plurality of available resource candidates, the resource candidates having a resource corresponding to the level and type of financing for exchange for control of the asset;
modifying a format of the resource request message to an appropriate format for sending to the selected at least one resource candidate;
sending the modified resource request message to the selected at least one resource candidate;
receiving a resource approval message from the at least one resource candidate, the resource approval message being indicative of an approval to supply the level and type of financing in accordance with the resource request of the modified resource request message; and
in an event that the resource approval message indicates approval to supply the level and type of financing, generating a transaction authorization message, the transaction authorization message being used to authorize a transaction to supply the level and type of financing on the basis of the modified resource request message.

* * * * *